(12) United States Patent
Chen

(10) Patent No.: US 12,446,569 B2
(45) Date of Patent: Oct. 21, 2025

(54) REPELLENT DEVICE AND METHOD OF USE THEREOF

(71) Applicant: Jenkins Asia Tech Shanghai Limited, Shanghai (CN)

(72) Inventor: Weng Kin Chen, Shanghai (CN)

(73) Assignee: Jenkins Asia Tech Shanghai Limited, Shanghai (CN)

( * ) Notice: Subject to any disclaimer, the term of this patent is extended or adjusted under 35 U.S.C. 154(b) by 0 days.

(21) Appl. No.: 18/888,912

(22) Filed: Sep. 18, 2024

(65) Prior Publication Data
US 2025/0120388 A1 Apr. 17, 2025

Related U.S. Application Data

(60) Provisional application No. 63/544,268, filed on Oct. 16, 2023.

(51) Int. Cl.
*A01M 29/06* (2011.01)

(52) U.S. Cl.
CPC .................................. *A01M 29/06* (2013.01)

(58) Field of Classification Search
CPC ........ A01K 29/00; A01K 29/06; A01K 29/08; A01K 29/22; A01K 29/30; A01K 29/34; A01M 5/08; A01M 2200/012; F16M 11/32
USPC ........ D22/120; 248/164, 431, 168, 439, 173
See application file for complete search history.

(56) References Cited

U.S. PATENT DOCUMENTS

| | | | | |
|---|---|---|---|---|
| 2,750,104 A | * | 6/1956 | Scaroulis | F04D 25/084 416/240 |
| 2,811,305 A | * | 10/1957 | Scaroulis | F04D 25/084 416/143 |
| 7,296,909 B2 | * | 11/2007 | Van Deursen | F16M 13/04 362/208 |
| 8,201,979 B2 | * | 6/2012 | Deighton | F16M 11/38 248/177.1 |
| 8,490,325 B2 | | 7/2013 | Gargiulo | |
| D921,830 S | | 6/2021 | Liu | |
| 11,953,017 B1 | * | 4/2024 | Chen | F04D 25/0673 |
| 12,038,010 B1 | * | 7/2024 | Chai | F04D 25/084 |
| 12,104,616 B1 | * | 10/2024 | Liu | F04D 29/522 |

(Continued)

FOREIGN PATENT DOCUMENTS

CN 220831619 U 4/2024

*Primary Examiner* — Joshua J Michener
*Assistant Examiner* — Nicole Paige Maccrate
(74) *Attorney, Agent, or Firm* — Levine Bagade Han LLP

(57) ABSTRACT

Disclosed are embodiments of a pest repellent device and methods of operating the pest repellent device. The device can comprise a device body having a first body end and a second body end, a blade motor housed within the device body, a rotatable component disposed at the first body end, one or more fan blades coupled to the rotatable component, and a foldable base assembly coupled to the second body end. The rotatable component can be rotated by the blade motor. The foldable base assembly can comprise at least three supporting legs with each of the supporting legs shaped as an elongated parabolic cylinder. The pest repellent device can have a folded configuration where the at least three supporting legs surround and partly encircle the device body and an unfolded configuration where the supporting legs are positioned at an angle with respect to a longitudinal axis of the device body.

14 Claims, 7 Drawing Sheets

(56) References Cited

U.S. PATENT DOCUMENTS

2007/0246619 A1* 10/2007 Chih .................... F16M 11/10
                                                    248/166
2019/0045773 A1* 2/2019 Smith .................. A01M 29/06

* cited by examiner

REPELLENT DEVICE AND METHOD OF USE THEREOF

CROSS-REFERENCE TO RELATED APPLICATION

This application claims priority to U.S. Provisional Patent Application No. 63/544,268 filed on Oct. 16, 2023, the content of which is incorporated herein by reference in its entirety.

FIELD OF TECHNOLOGY

The present disclosure relates generally to the field of pest repellent devices and, more specifically, to a portable pest repellent device with rotatable fan blades and foldable legs.

BACKGROUND

Outdoor dining or dining al fresco has never been more popular. However, dining in an outdoor environment or even dining in an indoor environment with open windows or doors has always been accompanied by challenges in the form of pests, such as flying insects or small birds, that are drawn to the food served.

There are a myriad of solutions on the market for dealing with pests such as fly-paper, fly swatters, insect repelling coils, and ultrasonic pest repelling devices. Recently, there has been a proliferation of fan-type pest repellent devices. However, most fan-type pest repellent devices have a bulky or heavy base that prevents these types of devices from tipping over when the fan blades are rotating. One downside to these devices is that their bulky or heavy bases take up valuable tablespace on a diner's table. Also, the bulky or heavy bases make such devices difficult to transport and diners rarely consider bringing such devices with them (for example, in their handbags, pockets, or backpacks) when dining outdoors or dining in an outdoor environment. This creates the problem where diners are at the mercy of the dining establishment when it comes to whether the dining establishment offers such a pest repellent device. In the vast majority of cases, dining establishments with outdoor dining venues do not offer such a device and the diner is forced to suffer through a meal by swatting at their food repeatedly while eating or covering their food with napkins or makeshift cloches. This inevitably ruins the dining experience for the diner even when the food itself is delicious.

Therefore, a solution is needed that addresses the above-mentioned problems. Such a solution should be portable, durable, and easy to set up. In addition, such a solution should be cost-effective to manufacture and able to withstand wear and tear in the course of usage.

SUMMARY

Disclosed are embodiments of a pest repellent device and methods of operating the pest repellent device. In some embodiments, the pest repellent device can comprise a device body having a first body end and a second body end. The pest repellent device can also comprise a blade motor housed at least partially within the device body and a rotatable component disposed at the first body end. The rotatable component can be configured to be rotated by the blade motor. The pest repellent device can also comprise one or more fan blades coupled to the rotatable component and a foldable base assembly coupled to the second body end of the device body. The foldable base assembly can comprise at least three supporting legs. Each of the supporting legs can be shaped as an elongated parabolic cylinder. The pest repellent device can have a folded configuration and an unfolded configuration. The at least three supporting legs can be configured to surround and partly encircle the device body when the pest repellent device is in the folded configuration. The at least three supporting legs can be configured to fold radially and pivotally outward and then pivotally downward with respect to a longitudinal axis of the device body until each of the supporting legs is positioned at an angle with respect to the longitudinal axis of the device body when the pest repellent device is in the unfolded configuration.

In some embodiments, the pest repellent device can further comprise a magnetic ring configured to fit over an upper segment of the device body. In these embodiments, each of the supporting legs can further comprise a ferromagnetic metal piece coupled to a distal end of the supporting leg. The ferromagnetic metal piece can be designed to magnetically attach to the magnetic ring when the pest repellent device is in the folded configuration to keep the supporting leg from inadvertently unfolding.

In some embodiments, the one or more fan blades can be configured to fold or hang downward when the pest repellent device is in the folded configuration. In this folded configuration, one or more of the supporting legs can be configured to at least partially encase one of the fan blades such that at least part of the fan blade is positioned in between an exterior surface of the device body and the one or more supporting legs. In this manner, the supporting leg can serve an additional purpose of protecting the fan blade when the pest repellent device is in the folded configuration and the pest repellent device is carried in a bag, backpack, or purse.

In some embodiments, the pest repellent device can further comprise a clip assembly comprising a top clip and a bottom clip configured to clip onto a proximal end of one of the fan blades. The rotatable component can further comprise at least one snap clamp. At least part of the clip assembly can be configured to snap into the snap clamp and allow the fan blade to pivot with respect to the device body.

In some embodiments, the pest repellent device can further comprise an activator button extending from the second body end of the device body. The activator button can be pressed or pushed to activate the blade motor to rotate or spin the one or more fan blades.

In some embodiments, at least one of the fan blades can be made in part of a flexible polymeric material.

In some embodiments, at least a portion of the device body can serve or function as a battery bin to receive and house a plurality of batteries to power the blade motor.

In some embodiments, the pest repellent device can further comprise a device base configured to be coupled to the second body end of the device body. Each of the supporting legs can be coupled to the device base via a hinge connector.

In some embodiments, the device body can be shaped as an elongated cylinder.

A method of using a pest repellent device is also disclosed. The method can comprise unfolding at least three supporting legs of the pest repellent device radially and pivotally outward and then pivotally downward with respect to a longitudinal axis of a device body of the pest repellent device until each of the supporting legs is positioned at an angle with respect to the longitudinal axis of the device body. Each of the supporting legs can be shaped as an elongated parabolic cylinder. The pest repellent device can further comprise a blade motor housed at least partially within the device body, an activator button extending from the device body and configured to activate the blade motor, a rotatable component disposed at a first body end of the device body, and one or more fan blades coupled to the rotatable component. The rotatable component can be configured to be rotated by the blade motor. The method can also comprise pressing the activator button to activate the blade motor and rotate the fan blades.

In some embodiments, the method can further comprise folding one or more of the fan blades vertically upward until the fan blade(s) are positioned at an angle (including a substantially 90 degree angle) with respect to the longitudinal axis of the device body. For example, when the pest repellent device comprises two fan blades, the method can comprise folding the two fan blades upward until the two fan blades are substantially parallel to one another (and substantially perpendicular to the longitudinal axis of the device body).

In some embodiments, the method can further comprise folding the at least three supporting legs vertically upward such that the at least three supporting legs surround and partly encircle the device body to cause the pest repellent device to attain a folded configuration.

In some embodiments, the pest repellent device can further comprise a magnetic ring configured to fit over an upper segment of the device body. Each of the supporting legs can further comprise a ferromagnetic metal piece coupled to a distal end of the supporting leg. In these embodiments, the step of folding the at least three supporting legs vertically upward can bring the ferromagnetic metal piece into contact with the magnetic ring to magnetically attach the ferromagnetic metal piece to the magnetic ring to prevent the supporting legs from inadvertently unfolding when the pest repellent device is in the folded configuration.

In some embodiments, the method can further comprise folding at least one of the fan blades vertically downwards toward the device body or allowing the fan blade to hang vertically downwards such that the fan blade is positioned in between an exterior surface of the device body and the one or more supporting legs when the pest repellent device is in the folded configuration.

An alternative embodiment of the pest repellent device is also disclosed comprising a device body having a first body end and a second body end and a blade motor housed at least partially within the device body. The pest repellent device can also comprise rotatable component disposed at the first body end. The rotatable component can be configured to be rotated by the blade motor. The pest repellent device can further comprise one or more fan blades coupled to the rotatable component and a foldable base assembly coupled to the second body end of the device body. The foldable base assembly can further comprise at least four supporting legs. The pest repellent device can have a folded configuration and an unfolded configuration. The at least four supporting legs can be configured to surround and partly enclose the device body when the pest repellent device is in the folded configuration. The four supporting legs can be configured to fold radially and pivotally outward and then pivotally downward with respect to a longitudinal axis of the device body until each of the supporting legs is positioned at an angle with respect to the longitudinal axis of the device body when the pest repellent device is in the unfolded configuration.

In some embodiments, the device body can be shaped as an elongated cuboid.

In some embodiments, the pest repellent device can further comprise a magnetic segment configured to fit over an upper segment of the device body. Each of the supporting legs can further comprise a ferromagnetic metal piece coupled to a distal end of the supporting leg. The ferromagnetic metal piece can be configured to magnetically attach to the magnetic segment when the pest repellent device is in the folded configuration.

DETAILED DESCRIPTION

Figure 1:
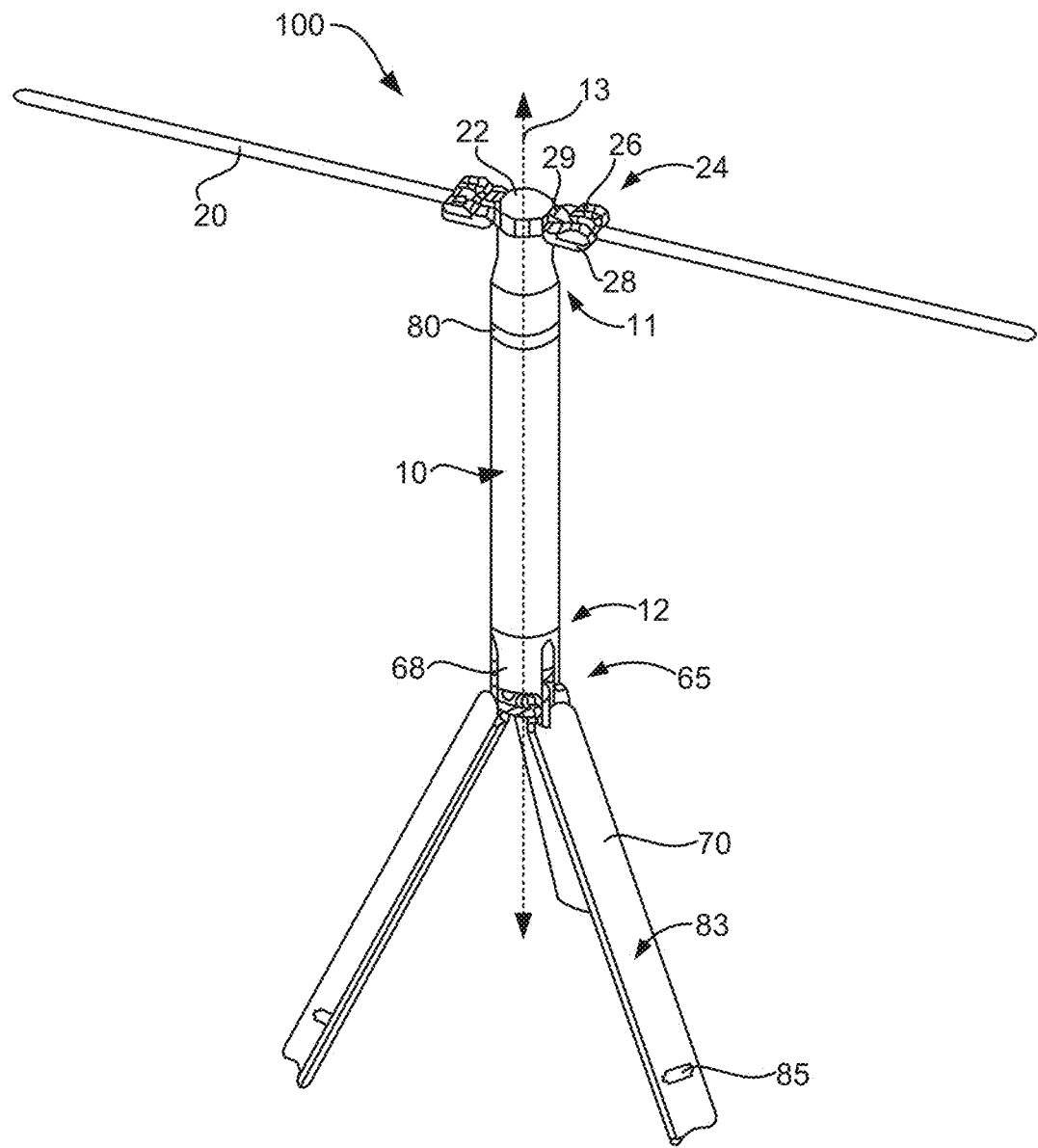
FIG. 1 illustrates a perspective view of one embodiment of a pest repellent device in operation in an unfolded configuration.

FIG. 1 illustrates a perspective view of one embodiment of a pest repellent device 100 in operation. The pest repellent device 100 is in an unfolded configuration when in operation. The pest repellent device 100 can comprise a device body 10 having a first body end 11 and a second body end 12 opposite the first body end 11. The first body end 11 can be vertically above the second body end 12 when the pest repellent device 100 is in the unfolded configuration.

The pest repellent device 100 can also comprise a rotatable component 22 disposed at the first body end 11 (or upper end) of the device body 10. As will be discussed in more detail in relation to FIG. 5, the pest repellent device 100 can further comprise a blade motor 30 housed at least partially within the device body 10. The rotatable component 22 can be configured to be rotated by the blade motor 30. The pest repellent device 100 can also comprise one or more fan blades 20 coupled to the rotatable component 22.

In some embodiments, at least a portion of the device body 10 can serve or function as a battery bin to receive and house a plurality of batteries (e.g., two AAA batteries) to power the blade motor 30. In certain embodiments, the device body 10 can be shaped as an elongated cylinder.

In alternative embodiments, the device body 10 can be shaped as an elongated cuboid, an elongated ovoid, or an elongated polygonal prism.

In some embodiments, the pest repellent device 100 can comprise two fan blades 20. In these embodiments, the fan blades 20 can be positioned diametrically opposed to one another.

In other embodiments, the pest repellent device 100 can comprise only one fan blade 20 or three or more fan blades 20.

The pest repellent device 100 can further comprise a foldable base assembly 65 coupled to the second body end 12 (or lower end) of the device body 10. The foldable base assembly 65 can comprise a plurality of supporting legs 70.

For example, the foldable base assembly 65 can comprise three supporting legs 70. In alternative embodiments, the foldable base assembly 65 can comprise four supporting legs 70 or more than four supporting legs 70.

The pest repellent device can further comprise a device base 68 configured to be coupled to the second body end 12 of the device body 10. Each of the supporting legs 70 can be coupled to the device base 68 via a hinge connector.

Figure 4:
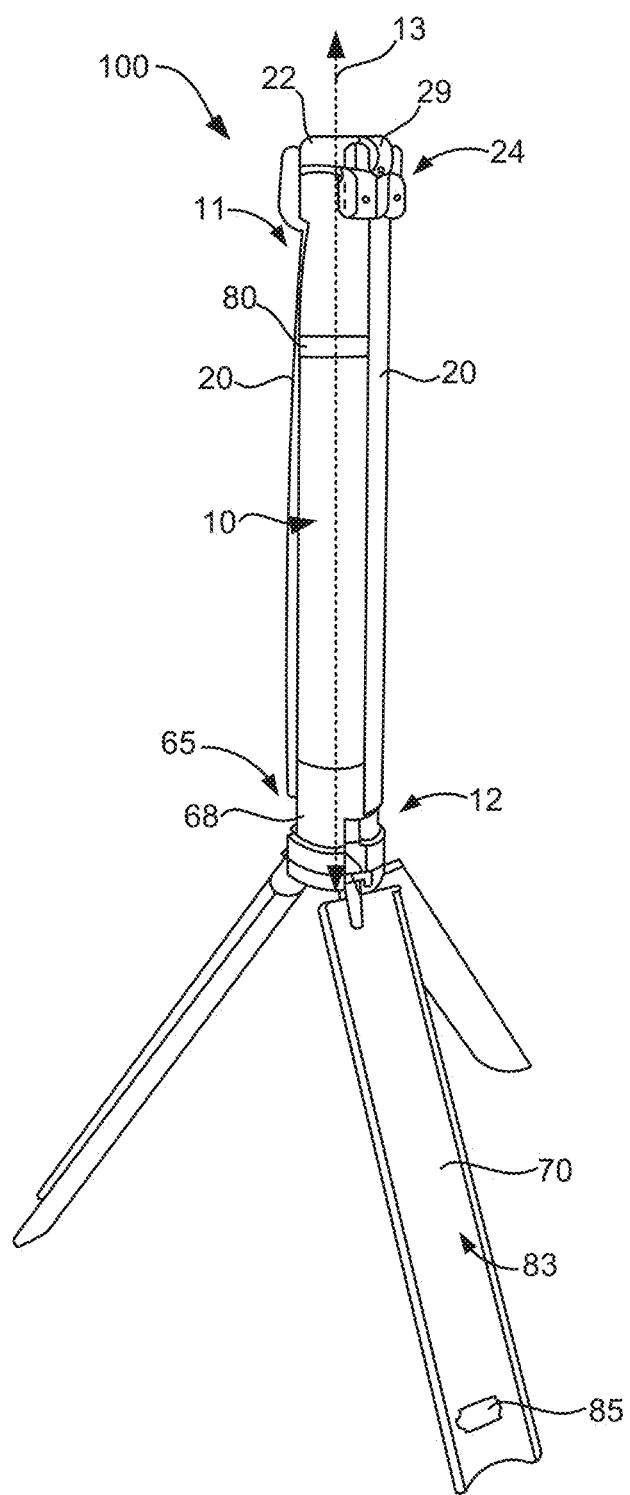
FIG. 4 illustrates a perspective view of the pest repellent device with supporting legs of the pest repellent device in an unfolded configuration but with fan blades of the pest repellent device folded downward.
Figure 5:
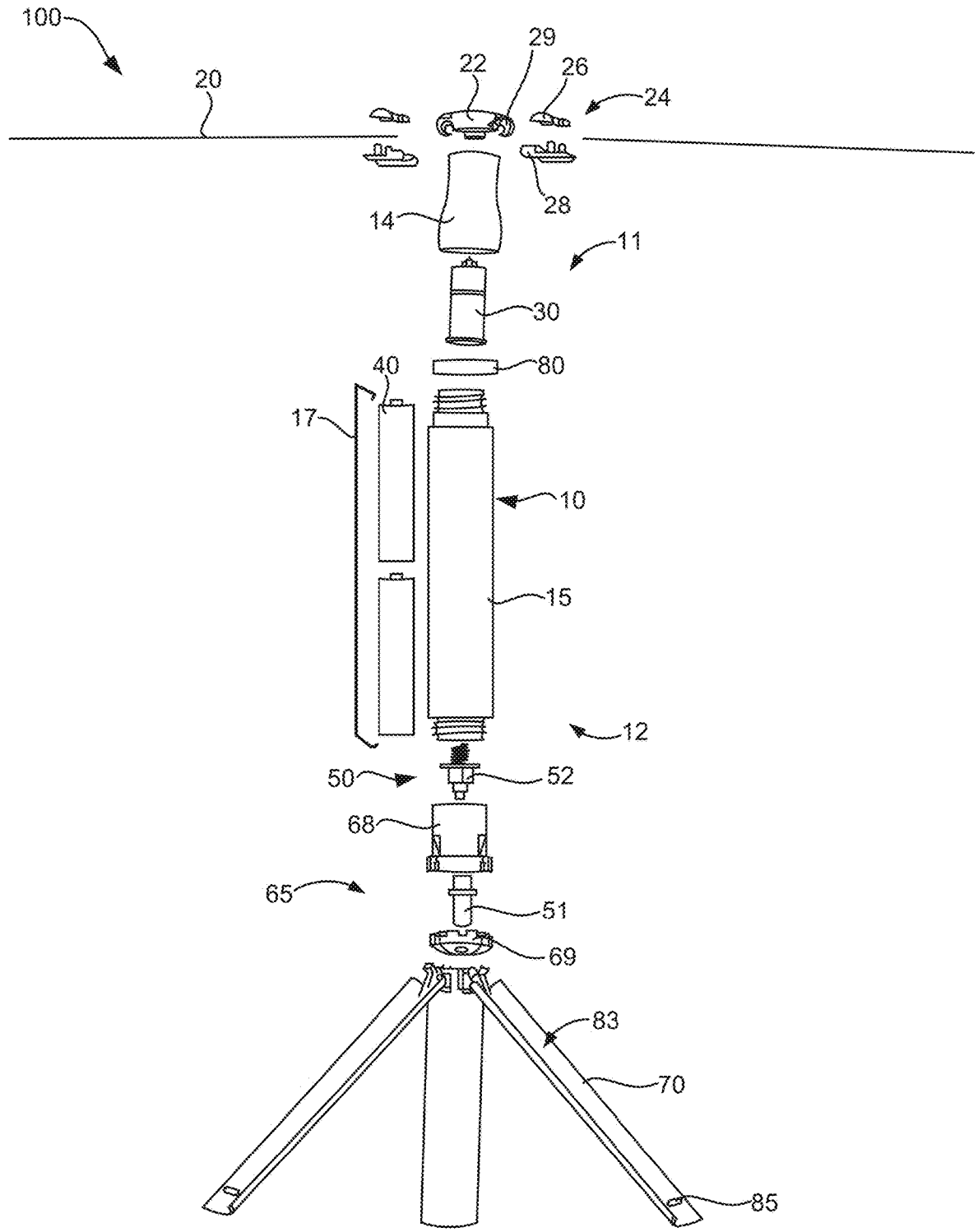
FIG. 5 illustrates an exploded view of one embodiment of the pest repellent device.

As shown in FIGS. 1, 4, and 5, each of the supporting legs 70 can be shaped as an elongated parabolic cylinder or an elongated curved/arcuate plank. The shape of the supporting leg 70 can contribute to the stability of the pest repellent device 100 when the pest repellent device 100 is in operation (i.e., when the fan blades 20 are being spun by the blade motor 30) and the supporting legs 70 are unfolded or splayed out to support the device body 10.

As will be discussed in more detail in the following sections, the pest repellent device 100 can have a folded configuration (see, e.g., FIG. 2) and an unfolded configuration (see FIG. 1).

When the pest repellent device 100 is in the folded configuration, the pest repellent device 100 can be transported or otherwise carried in a bag, purse, backpack, or pocket of a user. When the pest repellent device 100 is in the folded configuration, the at least three supporting legs 70 can surround and partly encircle or encase the device body 10.

When a user is ready to use or operate the pest repellent device 100, the user can fold the at least three supporting legs 70 radially and pivotally outward and then pivotally 11 downward with respect to a longitudinal axis 13 of the device body 10. The user can then fold the fan blade(s) 20 vertically upward until the fan blade(s) 20 are positioned at an angle (including a substantially 90 degree angle) with respect to the longitudinal axis 13 of the device body 10. For example, when the pest repellent device 100 comprises two fan blades 20, the two fan blades 20 can be folded or otherwise pushed upward until the two fan blades 20 are substantially parallel to one another (and substantially perpendicular to the longitudinal axis 13 of the device body 10).

The at least three supporting legs 70 can be configured or designed to fold radially and pivotally outward and then pivotally downward with respect to the longitudinal axis 13 of the device body 10 until each of the supporting legs 70 is positioned at an angle (e.g., an angle of between about 30 degrees and about 90 degrees or, more specifically, between about 30 degrees and about 60 degrees) with respect to the longitudinal axis 13 of the device body 10 when the pest repellent device 100 is in the unfolded configuration (see FIG. 1). In this manner, the three supporting legs 70 of the pest repellent device 100 can function as foldable tripod legs for the device body 10.

One technical advantage/benefit of the foldable supporting legs 70 disclosed herein is that a user can adjust the height of the pest repellent device 100 (e.g., raise or lower the height of the pest repellent 100 to accommodate different table settings) based on how much the user unfolds the supporting legs 70. For example, when the plurality of supporting legs 70 are more splayed out, the entire pest repellent device 100 can be lower in terms of its overall height. When the plurality of supporting legs 70 are less splayed out, the entire pest repellent device 100 can be higher in terms of its overall height.

The pest repellent device 100 can further comprise a magnetic ring 80 configured to fit over an upper segment of the device body 10 (the segment closer to the first body end 11). When the pest repellent device 100 comprises the magnetic ring 80 positioned along part of the device body 10, each of the supporting legs 70 can further comprise a ferromagnetic metal piece 85 coupled to a distal end of the supporting leg 70 (along a concave surface 83 or the curved surface of the supporting leg 70). The ferromagnetic metal piece 85 can be designed to magnetically attach to the magnetic ring 80 when the pest repellent device 100 is in the folded configuration to keep the supporting leg 70 from inadvertently unfolding.

In some embodiments, the magnetic ring 80 can be made of a metal alloy that allows the magnetic ring 80 to serve as a permanent magnet. For example, the magnetic ring 80 can be made of neodymium, samarium cobalt, or alnico (aluminum-nickel-cobalt). Also, for example, the magnetic ring 80 can be a ceramic or ferrite magnet (made of strontium carbonate and iron oxide).

In some embodiments, the pest repellent device 100 can further comprise a clip assembly 24 comprising a top clip 26 and a bottom clip 28 configured to clip onto or otherwise attach to a proximal end of one of the fan blades 20. The rotatable component 22 can further comprise at least one snap clamp 29. At least part of the clip assembly 24 (e.g., part of the bottom clip 28) can be configured to snap into the snap clamp 29 and allow the fan blade 20 to pivot or pivotally rotate with respect to the device body 10.

As will be discussed in more detail in relation to FIG. 2, the one or more fan blades 20 can be configured to fold or hang downward when the pest repellent device 100 is in the folded configuration. The fan blade 20 can be folded downward when a user pushes the top clip 26 downward. When the one or more fan blades 20 are folded downward, one or more of the supporting legs 70 can be configured to at least partially encase one of the fan blades 20 such that at least part of the fan blade 20 is positioned in between an exterior surface of the device body 10 and the one or more supporting legs 70. As such, the supporting legs 70 can serve an additional purpose of functioning as protective casings for the fan blades 20 when the pest repellent device 100 is in the folded configuration (see, e.g., FIG. 2). For example, the supporting legs 70 can protect the fan blades 20 from being ripped off or otherwise dislodged or torn when the pest repellent device 100 is in the folded configuration and carried/stored in a bag, backpack, purse, or pocket of a user.

As will be discussed in more detail in relation to FIGS. 5 and 7, the pest repellent device 100 can further comprise an activator button 51 extending from the second body end 12 of the device body 10. The activator button 51 can be pressed or pushed to activate the blade motor 30 to rotate or spin the one or more fan blades 20.

When the blade motor 30 is activated or otherwise turned on, the one or more fan blades 20 can be spun or rotated at between 250 and 450 revolutions-per-minute (RPM). In some embodiments, the one or more fan blades 20 can be spun or rotated at between 50 and 250 revolutions-per-minute (RPM).

At least one of the fan blades 20 can be made in part of a flexible polymeric material. In some embodiments, the one or more fan blades 20 can be made, at least in part, of a flexible polyvinyl chloride (PVC). In other embodiments, the one or more fan blades 20 can be made of silicone, thermoplastic elastomers, thermoplastic urethanes, or thermoplastic polyolefins.

Figure 2:
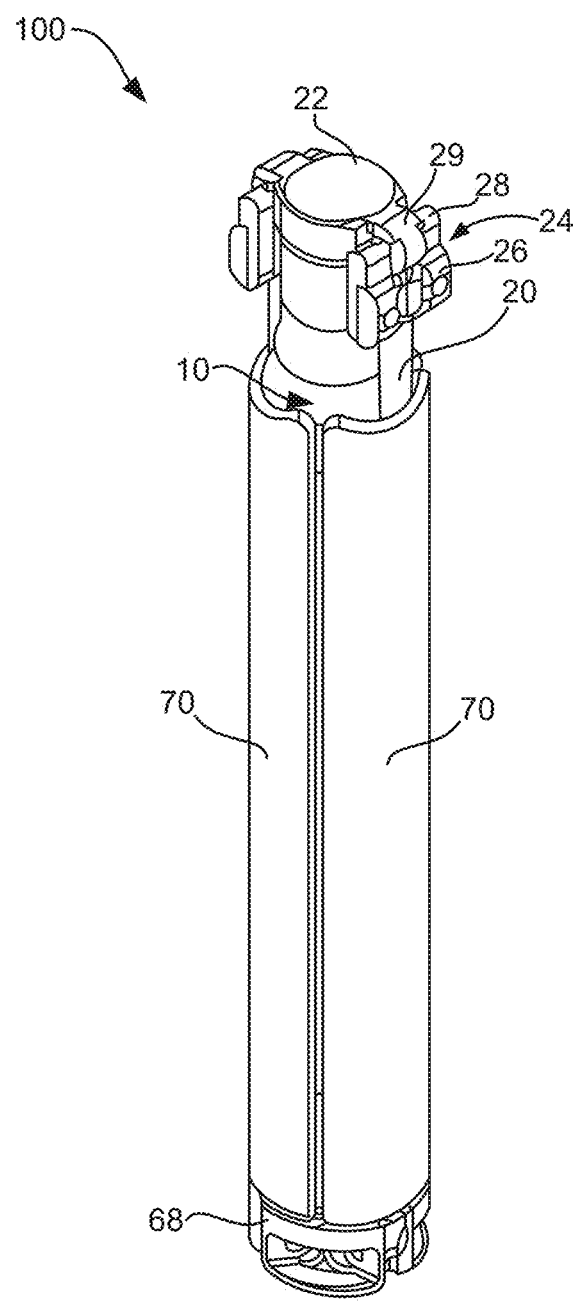
FIG. 2 illustrates a perspective view of the pest repellent device in a folded configuration when not in operation.

FIG. 2 illustrates a perspective view of the pest repellent device 100 in a folded configuration (i.e., when the pest repellent device 100 is not in operation and is ready to be transported or stored). When the pest repellent device 100 is in the folded configuration, the pest repellent device 100 can be transported or carried in a bag, purse, backpack, or pocket of a user.

As shown in FIG. 2, when the pest repellent device 100 is in the folded configuration, the at least three supporting legs 70 can surround and partly encircle or encase the device body 10. When a user is ready to use or operate the pest repellent device 100, the user can fold the at least three supporting legs 70 radially and pivotally outward and then pivotally downward with respect to a longitudinal axis 13 of the device body 10.

The at least three supporting legs 70 can be configured or designed to fold radially and pivotally outward and then pivotally downward with respect to the longitudinal axis 13 of the device body 10 until each of the supporting legs 70 is positioned at an angle (e.g., an angle of between about 30 degrees and about 90 degrees or, more specifically, between about 30 degrees and about 60 degrees) with respect to the longitudinal axis 13 of the device body 10 when the pest repellent device 100 is in the unfolded configuration (see FIG. 1). In this manner, the three supporting legs 70 of the pest repellent device 100 can function as foldable tripod legs for the device body 10.

As previously discussed, the magnetic ring 80 (see, e.g., FIG. 1 or FIG. 4) located along the upper segment of the device body 10 (the segment closer to the first body end 11) can magnetically engage or otherwise magnetically couple to the ferromagnetic metal piece 85 of each of the supporting legs 70 to prevent the supporting leg 70 from inadvertently unfolding when the pest repellent device 100 is in the folded configuration. The ferromagnetic metal piece 85 can be embedded, adhered, or molded to the concave surface 83 of the supporting leg 70 (see, e.g., FIG. 1 or FIG. 4).

Also as shown in FIG. 2, the one or more fan blades 20 can be configured to fold downward and remain hanging downward when the pest repellent device 100 is in the folded configuration. In this folded configuration, the supporting legs 70 can at least partially encase the fan blades 20 such that the fan blades 20 are positioned in between an exterior surface of the device body 10 and the supporting legs 70. As such, the supporting legs 70 can serve an additional purpose of acting as protective casings for the fan blades 20 when the pest repellent device 100 is in the folded configuration. For example, the supporting legs 70 can protect the fan blades 20 from being ripped or torn off or otherwise dislodged when the pest repellent device 100 is in the folded configuration and carried/stored in a bag, backpack, purse, or pocket of a user.

Moreover, the concave surface profile of each of the supporting legs 70 can allow the supporting legs 70 to fit tightly around the cylindrical device body 10. This can reduce the overall device diameter or overall width of the pest repellent device 100 to make the pest repellent device 100 easier to transport, carry, or store when the pest repellent device 100 is in the folded configuration.

In alternative embodiments, each of the supporting legs 70 can be substantially shaped as an elongated flat plank or elongated strip. In these embodiments, the device body 10 can be substantially shaped as an elongated cuboid or rectangular prism. Also, in these embodiments, the pest repellent device 100 can comprise four supporting legs 70.

Figure 3:
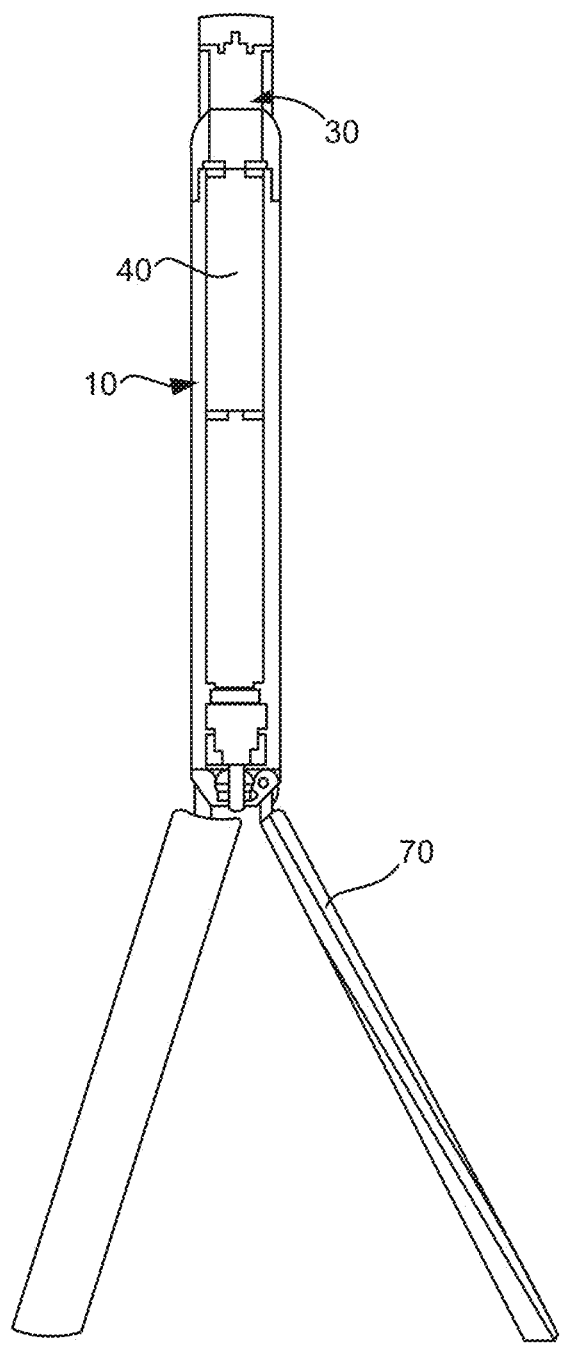
FIG. 3 illustrates a partial cross-section of a device body of the pest repellent device.

FIG. 3 illustrates a partial cross-section of the device body 10 of the pest repellent device 100. As shown in FIG. 3, at least a portion of the device body 10 (e.g., the substantially cylindrical device body 10) can serve as a battery bin to receive and house two batteries 40 (e.g., two AAA batteries) to power the blade motor 30.

FIG. 4 illustrates a perspective view of the pest repellent device 100 with the supporting legs 70 in an unfolded configuration but with the fan blades 20 of the pest repellent device 100 folded and hanging downward and not spinning.

A method of setting up the pest repellent device 100 can comprise unfolding the three or more supporting legs 70 of the pest repellent device 100 radially and pivotally outward and then pivotally downward with respect to the longitudinal axis 13 of the device body 10 of the pest repellent device 100 until each of the supporting legs 70 is positioned at an angle (e.g., an angle of between about 30 degrees and about 90 degrees or, more specifically, between about 30 degrees and about 60 degrees) with respect to the longitudinal axis 13 of the device body 10. As shown in FIG. 4, each of the supporting legs 70 can be shaped as an elongated parabolic cylinder.

When the pest repellent device 100 has three supporting legs 70, the supporting legs 70 can function as tripod legs for the device body 10. After unfolding the supporting legs 70, the user can unfold the fan blade(s) 20 by pushing or lifting up the fan blade(s) 20.

Once the fan blade(s) 20 are unfolded or pushed/lifted up, the user can then press or push the activator button 51 (see, e.g., FIG. 5 or FIG. 7) to activate the blade motor 30 (see, e.g., FIG. 5) to rotate or spin the rotatable component 22 (also referred to as a fan head) and the fan blade(s) 20 coupled to the rotatable component 22. The fan blade(s) 20 can be spun or rotated at between 50 and 450 revolutions-per-minute (RPM) (e.g., between 100 and 400 RPM). The fan blade(s) 20, when spinning or rotating in a plane substantially perpendicular to the longitudinal axis 13 of the device body 10, can appear like helicopter rotor blades. Pests, such as flying insects or small birds, are deterred by the fast spinning fan blade(s) 20 from approaching any food items within the vicinity of the pest repellent device 100 (e.g., food items under the spinning fan blade(s) 20).

Once a user is finished with the user's dining experience, the user can fold the one or more fan blades 70 vertically downward toward the device body 10 (for example, by pushing down on the top clip 26). The user can then fold the three or more supporting legs 70 vertically and pivotally upward such that the three or more supporting legs 70 surround and partly encircle the device body 10 to cause the pest repellent device 100 to attain a compact folded configuration. The fan blade(s) 20 can be positioned in between an exterior surface of the device body 10 and the supporting legs 70 when the pest repellent device 100 is in the folded configuration.

As previously discussed, the pest repellent device 100 can further comprise a magnetic ring 80 configured to fit over an upper segment of the device body 10. Each of the supporting legs 70 can comprise a ferromagnetic metal piece 85 coupled to a distal end of the supporting leg 70. In these embodiments, the step of folding the supporting legs 70 vertically and pivotally upward can bring the ferromagnetic metal pieces 85 into contact with the magnetic ring 80 to magnetically attach the ferromagnetic metal pieces 85 to the magnetic ring 80 to prevent the supporting legs 70 from inadvertently unfolding when the pest repellent device 100 is in the folded configuration.

In some embodiments, the ferromagnetic metal piece 85 can be molded or otherwise embedded near a distal end or distal segment of a supporting leg 70. In other embodiments, the ferromagnetic metal piece 85 can be adhered to a distal end or distal segment of a supporting leg 70 via an adhesive (e.g., an acrylic adhesive).

FIG. 5 illustrates an exploded view of the pest repellent device 100. The pest repellent device 100 can comprise a device body 10 having a first body end 11 and a second body end opposite the first body end 11. The device body 10 can comprise an upper motor bin portion 14 and a lower battery bin portion 15. The upper motor bin portion 14 can be screwed into or otherwise fastened to the lower battery bin portion 15 via a threaded connection (e.g., a male/outer threaded portion or fitting on an upper segment of the battery bin portion 15 and a female/inner threaded portion or fitting on a lower segment of the motor bin portion 14).

The upper motor bin portion 14 can be configured to house the blade motor 30. The blade motor 30 can be configured to drive the rotation of the rotatable component 22 (which can also be referred to as a fan head). For example, the blade motor 30 can comprise a spindle or keyed component at the top of the blade motor 30 that keys into or connects with a complementary component or receiving receptacle defined within or on the bottom of the rotatable component 22. The rotatable component 22 can be positioned at the top of the motor bin portion 14. In some embodiments, a small gap or separation space can separate the rotatable component 22 from the top of the motor bin portion 14. In other embodiments, a lubricious or smooth layer or surface can be disposed in between the rotatable component 22 and the top of the motor bin portion 14.

The battery bin portion 15 of the device body 10 can be configured to serve as a housing for batteries 40 (e.g., two AAA batteries) used to power the blade motor 30. In some embodiments, the blade motor 30 can be a 3V DC motor. In other embodiments, the device body 10 can serve as a housing for larger batteries or three or more batteries and the blade motor 30 can be a 4.5V motor, a 5V motor, or 6V motor.

The battery bin portion 15 can also comprise a piece of conductive shrapnel 17 extending within the battery bin portion 15 to improve the conductivity of the batteries 40 and increase the service life of the batteries 40. In some embodiments, the conductive shrapnel 17 can be a long strip of stainless steel or another type of conductive metal.

The pest repellent device 100 can further comprise a magnetic ring 80 configured to fit over a tapered or radially narrowed upper segment of the battery bin portion 15. The bottom end of the motor bin portion 14 and the top of the battery bin portion 15 can work together to secure the magnetic ring 80 in place once the magnetic ring 80 is placed over the tapered or narrowed segment of the batter bin portion 15. For example, fastening or screwing the top of the battery bin portion 15 into the motor bin portion 14 can secure the magnetic ring 80 in place. When the pest repellent device 100 comprises the magnetic ring 80, each of the supporting legs 70 can further comprise a ferromagnetic metal piece 85 coupled to a distal end of the supporting leg 70 (along the concave surface 83 or the curved surface of the supporting leg 70). The ferromagnetic metal piece 85 can be designed to magnetically attach to the magnetic ring 80 when the pest repellent device 100 is in the folded configuration to keep the supporting leg 70 from inadvertently unfolding.

In some embodiments, the ferromagnetic metal piece 85 can be a piece of iron or an iron sheet or strip embedded along part of the concave surface 83 of each of the supporting legs 70.

The pest repellent device 100 can further comprise a button assembly 50 comprising a button printed circuit board (PCB) 52 and a button 51 or button extender operably coupled to the button PCB. As will be discussed in more detail in relation to FIG. 7, at least part of the button 51 (the part of the button 51 pressed by the user) can be exposed by an opening 61 (see FIG. 7) defined along a bottom of the device base 68.

The device base 68 can be coupled to the bottom of the battery bin portion 15 by a threaded connection. For example, the bottom of the battery bin portion 15 can be defined by a male/outer threaded portion or fitting and the device base 68 can comprise a female/inner threaded portion or fitting defined along a top of the device base 68. The male/outer threaded portion of the bottom of the battery bin portion 15 can be screwed into or otherwise fastened to the top of the female/inner threaded portion of the device base 68.

The device base 68 can serve as a housing or accommodation space for at least part of the button assembly 50. The device base 68 can also be covered at a lower end by a base cover 69. In some embodiments, the base cover 69 can secure or connect the supporting legs 70 to the device base 68. For example, at least part of the base cover 69 or device base 68 can form a hinge-type connection with an upper portion of each of the supporting legs 70.

In some embodiments, the supporting legs 70 and the base cover 69 can be made in part of a rigid thermoplastic such as polyoxymethylene (POM).

In alternative embodiments, the supporting legs 70 and the base cover 69 can be made in part of another type of rigid thermoplastic or made of a metallic material such as aluminum, stainless steel, or titanium.

In these and other embodiments, the device base 68, the device body 10 including the motor bin portion 14 and the battery bin portion 15, the rotatable component 22, and the clip assembly 24 can be made of a polymeric material such as acrylonitrile butadiene styrene (ABS). In alternative embodiments, device base 68, the device body 10 including the motor bin portion 14 and the battery bin portion 15, the rotatable component 22, and the clip assembly 24 can be made of another type of polymeric material such as polylactic acid (PLA) or polycarbonate (PC) or made, at least in part, of a metallic material such as aluminum, stainless steel, or titanium.

Although FIGS. 1-5 illustrate an embodiment of the pest repellent device 100 with three supporting legs 70, it is contemplated by this disclosure that other embodiments of the pest repellent device can comprise four or more supporting legs. For example, disclosed is an alternative embodiment of the pest repellent device. In this alternative embodiment, the pest repellent device can comprise a device body having a first body end and a second body end and a blade motor housed at least partially within the device body. The pest repellent device can also comprise a rotatable component disposed at the first body end. The rotatable component can be configured to be rotated by the blade motor 30. The pest repellent device can further comprise one or more fan blades coupled to the rotatable component and a foldable base assembly coupled to the second body end of the device body.

In this alternative embodiment, the foldable base assembly can comprise four supporting legs (or more than four supporting legs). The pest repellent device can have a folded configuration and an unfolded configuration. The four supporting legs can be configured to surround and partly enclose the device body when the pest repellent device is in the folded configuration. The four supporting legs can be configured to fold laterally outward and vertically downward and each of the supporting legs can be positioned at an angle with respect to a longitudinal axis of the device body when the pest repellent device is in the unfolded configuration.

In this alternative embodiment, the device body can be shaped as an elongated cuboid.

In this alternative embodiment, each of the four supporting legs can be substantially shaped as an elongated flat strip or plank, an elongated rectangular plane, or an elongated and flattened rectangular prism.

In this alternative embodiment, the pest repellent device can further comprise a magnetic segment configured to fit over an upper segment of the device body. Each of the supporting legs can further comprise a ferromagnetic metal piece coupled to a distal end of the supporting leg. The ferromagnetic metal piece can be configured to magnetically attach to the magnetic segment when the pest repellent device is in the folded configuration.

Figure 6:
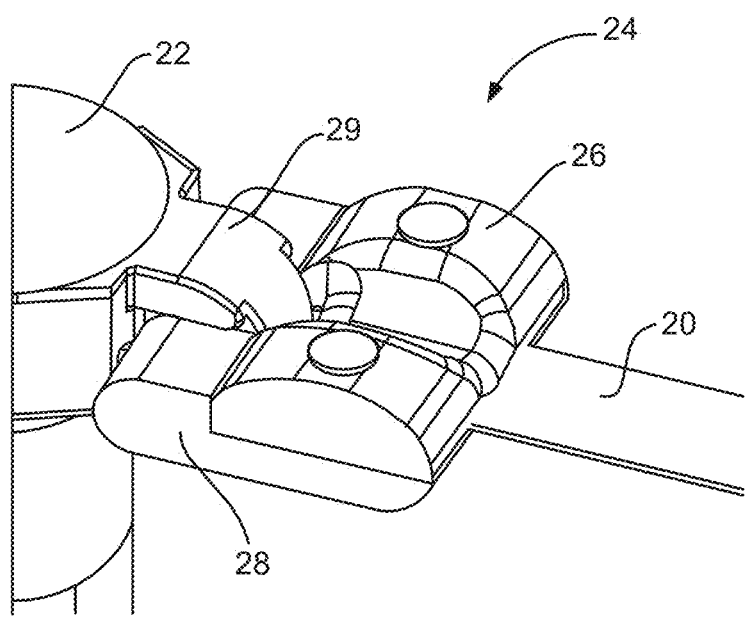
FIG. 6 illustrates a close-up view of a clip assembly securing part of a fan blade to a snap clamp of a rotatable component of the pest repellent device.

FIG. 6 illustrates a close-up view of a clip assembly 24 securing part of a fan blade 20 to a snap clamp 29 of the rotatable component 22 (also referred to as a fan head) of the pest repellent device 100. The clip assembly 24 can comprise a top clip 26 and a bottom clip 28. The top clip 26 can snap together with the bottom clip 28 to attach or clamp onto a proximal end of the fan blade 20.

The rotatable component 22 can further comprise at least one snap clamp 29. In embodiments where the pest repellent device 100 comprises two fan blades 20, the rotatable component 22 can comprise two snap clamps 29. In further embodiments, the rotatable component 22 can comprise three or more snap clamps 29 and three or more fan blades 20.

At least part of the clip assembly 24 (e.g., part of the bottom clip 28) can be configured to snap into the snap clamp 29 (via an interference fit) and allow the fan blade 20 to pivot or pivotally rotate with respect to the device body 10. This can allow the fan blade 20 to fold downward and hang downward when the pest repellent device 100 is in the folded configuration.

In some embodiments, the clip assembly 24 (including the top clip and the bottom clip 28) can be made of a polymeric material such as acrylonitrile butadiene styrene (ABS). In alternative embodiments, the clip assembly 24 can be made of polylactic acid (PLA) or polycarbonate (PC).

In alternative embodiments, at least part of the clip assembly 24 (including any of the top clip and/or the bottom clip 28) can be made of a metallic material such as aluminum, stainless steel, or titanium.

Figure 7:
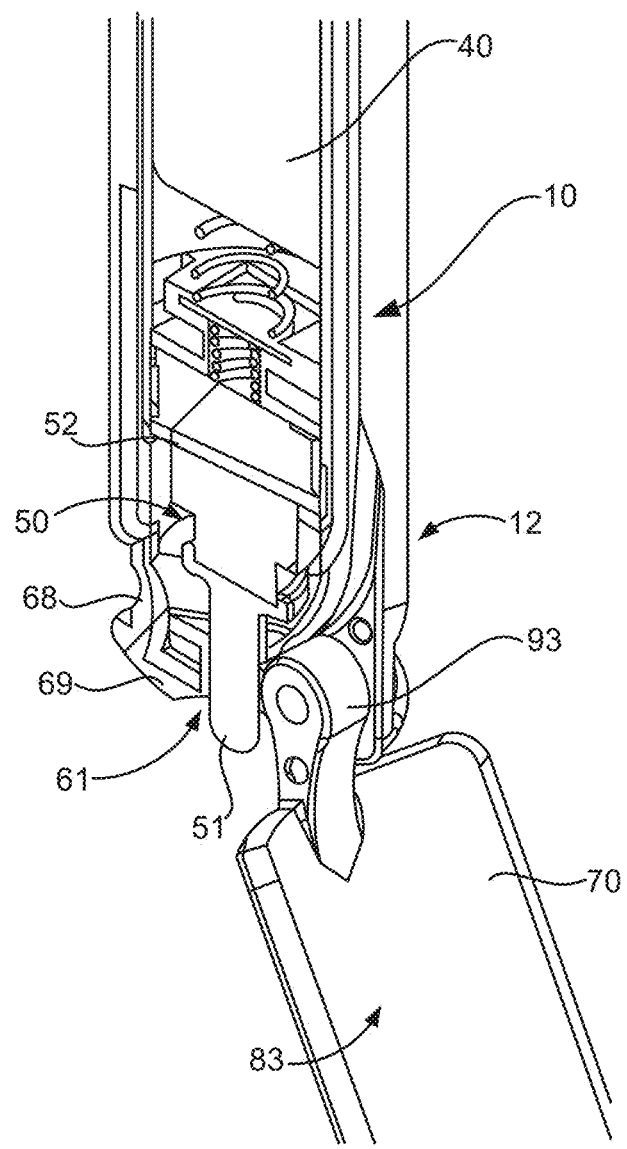
FIG. 7 illustrates a close-up view of one supporting leg of the pest repellent device in an unfolded configuration.

FIG. 7 illustrates a close-up view of one supporting leg 70 of the pest repellent device 100 in an unfolded configuration. The pest repellent device 100 can comprise a device base 68 coupled to the second body end 12 of the device body 10. Each of the supporting legs 70 can be coupled to the device base 68 via a hinge connector 93 or a hinge-type mechanism.

The hinge connector 93 or the hinge-type mechanism can allow each of the supporting legs 70 to pivot and fold vertically upwards and downwards.

FIG. 7 also illustrates that the device base 68 can comprise an opening 61 or aperture that exposes part of the button 51. The distal tip or surface of the button 51 (the part of the button that can be pressed or pushed by the user) can be recessed or slightly raised with respect to a base cover 69 of the device base 68. This can prevent the button 51 from being inadvertently pressed by a user when the pest repellent device 100 is being transported or carried.

In some embodiments, the button 51 can be a spring-type or push button. In other embodiments, the button 51 can be a toggle button or a rotary switch.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps or operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of" when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to ±0.1%, ±1%, ±5%, or ±10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

The invention claimed is:

1. A pest repellent device, comprising:
　a device body having a first body end, a second body end, and a magnetic ring configured to fit over an upper segment of the device body;
　a blade motor housed at least partially within the device body;
　a rotatable component disposed at the first body end, wherein the rotatable component is configured to be rotated by the blade motor;
　one or more fan blades coupled to the rotatable component; and
　a foldable base assembly coupled to the second body end, wherein the foldable base assembly comprises three supporting legs, wherein each of the supporting legs is shaped as an elongated parabolic cylinder, wherein the pest repellent device has a folded configuration and an unfolded configuration, wherein the three supporting legs are configured to surround and partly encircle the device body when the pest repellent device is in the folded configuration, and wherein the three supporting legs are configured to fold radially and pivotally outward and then pivotally downward with respect to a longitudinal axis of the device body until each of the supporting legs is positioned at an angle with respect to the longitudinal axis of the device body when the pest repellent device is in the unfolded configuration,
　wherein each of the supporting legs further comprises a ferromagnetic metal piece coupled to a distal end of the supporting leg, wherein the ferromagnetic metal piece is configured to magnetically attach to the magnetic ring when the pest repellent device is in the folded configuration, and
　wherein the one or more fan blades are configured to hang downward when the pest repellent device is in the folded configuration, and wherein one or more of the supporting legs is configured to at least partially encase one of the fan blades such that at least part of the fan blade is positioned in between an exterior surface of the device body and the one or more supporting legs when the pest repellent device is in the folded configuration.

2. The pest repellent device of claim 1, further comprising a clip assembly comprising a top clip and a bottom clip configured to clip onto a proximal end of one of the fan blades, wherein the rotatable component further comprises at least one snap clamp, wherein at least part of the clip assembly is configured to snap into the snap clamp and allow the fan blade to pivot with respect to the device body.

3. The pest repellent device of claim 1, further comprising an activator button extending from the second body end of the device body, wherein the activator button is configured to activate the blade motor to rotate or spin the one or more fan blades.

4. The pest repellent device of claim 1, wherein at least one of the fan blades is made of a flexible polymeric material.

5. The pest repellent device of claim 1, wherein at least a portion of the device body serves as a battery bin to receive and house a plurality of batteries to power the blade motor.

6. The pest repellent device of claim 1, further comprising a device base configured to be coupled to the second body end of the device body, wherein each of the supporting legs is coupled to the device base via a hinge connector.

7. The pest repellent device of claim 1, wherein the device body is shaped as an elongated cylinder.

8. A method of using a pest repellent device, comprising:
　unfolding at least three supporting legs of the pest repellent device radially and pivotally outward and then pivotally downward with respect to a longitudinal axis of a device body of the pest repellent device until each of the supporting legs is positioned at an angle with respect to the longitudinal axis of the device body, wherein each of the supporting legs is shaped as an elongated parabolic cylinder, and wherein the pest repellent device further comprises:
　　a blade motor housed at least partially within the device body,
　　an activator button extending from the device body and configured to activate the blade motor, a rotatable component disposed at a first body end of the device body, wherein the rotatable component is configured to be rotated by the blade motor, and one or more fan blades coupled to the rotatable component;

pressing the activator button to activate the blade motor and rotate the fan blades; and folding at least one of the fan blades vertically downwards toward the device body such that the fan blade is positioned in between an exterior surface of the device body and the one or more supporting legs when the pest repellent device is in a folded configuration.

9. The method of claim 8, further comprising folding the at least three supporting legs vertically upward such that the at least three supporting legs surround and partly encircle the device body to cause the pest repellent device to attain the folded configuration.

10. The method of claim 9, wherein the pest repellent device further comprises a magnetic ring configured to fit over an upper segment of the device body, wherein each of the supporting legs further comprises a ferromagnetic metal piece coupled to a distal end of the supporting leg, wherein folding the at least three supporting legs vertically upward brings the ferromagnetic metal piece into contact with the magnetic ring to magnetically attach the ferromagnetic metal piece to the magnetic ring to prevent the supporting legs from unfolding when the pest repellent device is in the folded configuration.

11. The method of claim 9, wherein at least one of the fan blades is made of a flexible polymeric material.

12. The method of claim 9, wherein at least a portion of the device body serves as a battery bin to receive and house a plurality of batteries to power the blade motor.

13. The method of claim 9, further comprising a device base configured to be coupled to the device body, wherein each of the supporting legs is coupled to the device base via a hinge connector.

14. The method of claim 9, wherein the device body is shaped as an elongated cylinder.

* * * * *